United States Patent
Liu et al.

(10) Patent No.: US 9,878,486 B2
(45) Date of Patent: Jan. 30, 2018

(54) HIGH FLASH POINT FLUIDS FOR IN SITU PLASTICIZATION OF POLYMERS

(71) Applicant: BAKER HUGHES INCORPORATED, Houston, TX (US)

(72) Inventors: Bairu Liu, Katy, TX (US); Anil Sadana, Houston, TX (US); James B. Crews, Willis, TX (US)

(73) Assignee: Baker Hughes, a GE company, LLC, Houston, TX (US)

(*) Notice: Subject to any disclaimer, the term of this patent is extended or adjusted under 35 U.S.C. 154(b) by 8 days.

(21) Appl. No.: 15/082,080

(22) Filed: Mar. 28, 2016

(65) Prior Publication Data

US 2016/0208574 A1    Jul. 21, 2016

Related U.S. Application Data

(63) Continuation-in-part of application No. 14/033,178, filed on Sep. 20, 2013, now abandoned, which is a continuation-in-part of application No. 13/334,394, filed on Dec. 22, 2011, now abandoned.

(51) Int. Cl.
| | |
|---|---|
| *E21B 33/10* | (2006.01) |
| *B29C 61/04* | (2006.01) |
| *B29C 61/06* | (2006.01) |
| *E21B 33/12* | (2006.01) |

(52) U.S. Cl.
CPC ............. *B29C 61/04* (2013.01); *B29C 61/06* (2013.01); *E21B 33/12* (2013.01); *E21B 33/1208* (2013.01)

(58) Field of Classification Search
None
See application file for complete search history.

(56) References Cited

U.S. PATENT DOCUMENTS

| | | | |
|---|---|---|---|
| 7,318,481 B2 | 1/2008 | Richard | |
| 7,828,055 B2 | 11/2010 | Willauer et al. | |
| 7,926,565 B2 | 4/2011 | Duan et al. | |
| 8,353,346 B2 | 1/2013 | Johnson et al. | |
| 2005/0272806 A1* | 12/2005 | Falotico | A61K 9/0019 514/449 |
| 2011/0252781 A1 | 10/2011 | Johnson et al. | |
| 2013/0161026 A1 | 6/2013 | Garza et al. | |
| 2014/0020910 A1 | 1/2014 | Falkner et al. | |
| 2014/0309691 A1* | 10/2014 | Brown | A61L 31/06 606/232 |

* cited by examiner

*Primary Examiner* — Angela M DiTrani
*Assistant Examiner* — Andrew H Sue-Ako
(74) *Attorney, Agent, or Firm* — Mossman, Kumar & Tyler, P.C.

(57) ABSTRACT

An in situ method to deploy and/or plasticize a shape-memory material in order to change the material's physical dimensions and/or mechanical properties, includes a method for deploying a shape memory polymer having a deformed or compressed shape in an environment at a first temperature, the shape memory polymer having a first glass transition temperature which is greater than the first temperature. The method also includes contacting the shape memory polymer with an activation fluid in an amount effective to decrease the glass transition temperature of the shape memory polymer from the first glass transition temperature to a second glass transition temperature which is less than or equal to the first temperature, where the activation fluid comprises a sugar present in an amount effective to raise a flash point of the activation fluid.

13 Claims, 9 Drawing Sheets

HIGH FLASH POINT FLUIDS FOR IN SITU PLASTICIZATION OF POLYMERS

CROSS-REFERENCE TO RELATED APPLICATION

This application is a continuation-in-part application of U.S. patent application Ser. No. 14/033,178 filed Sep. 20, 2013, which is a continuation-in-part of U.S. patent application Ser. No. 13/334,394 filed Dec. 22, 2011, now abandoned, all of which are incorporated herein by reference in their entirety.

TECHNICAL FIELD

The present invention relates to methods and compositions used in oil and gas wellbores for employing shape-memory materials, and more particularly relates to methods and compositions for changing the glass transition temperature of shape-memory materials using an activation fluid that has an additive to raise its flash point.

TECHNICAL BACKGROUND

Shape memory polymers (SMPs) are polymers which regain their original shape when heated above their glass transition temperature (Tg). Articles are formed from shape memory polymers by first heating them above the glass transition temperature and then shaping the polymer, then subsequently fixing the shape by cooling to below the glass transition temperature. During subsequent deployment, the shaped article is heated above the glass transition temperature to allow recovery of the first molded shape.

A variety of shape memory polymers (SMPs) have been used in numerous areas. In particular, SMPs have been used in downhole environments (e.g., oil and natural gas production) as sealing members and filters. However, deployment of the SMP has involved thermal activation. In thermal activation, the temperature of the SMP is increased above the glass transition temperature (Tg) of the SMP to recover its original shape. As a thermal activation medium, heated downhole fluids are used to increase the temperature of the SMP to greater than its Tg.

U.S. Patent Application Publication No. 2011/0252781 to Johnson, et al. and assigned to Baker Hughes Incorporated discloses that the actuation and control of the deployment of a polymeric memory-shape material (SMP) on a wellbore device on a downhole tool may be accomplished by treating a compacted or compressed polymeric memory-shape material with a deployment fluid to lower its $T_g$ and/or decrease its rigidity, thereby softening the polymeric shape-memory material at a given temperature and triggering its expansion or recovery at a lower temperature. Alternatively, the deployment of the compacted or compressed polymeric memory-shape material may be prevented or inhibited by shielding the material with an environment of a fluid that does not substantially lower its $T_g$, decrease its rigidity or both, and then subsequently contacting the material with a deployment fluid. Chemicals used as deployment fluids or activation fluids should exhibit high flash points to be safely utilized in the field.

Alternatives to thermal activation of SMP articles downhole would be well-received in the art. It would be desirable to raise the flash points of deployment fluids or activation fluids to make them safer to handle.

SUMMARY

There is provided, in one non-limiting form, a method for deploying a shape memory polymer, comprising disposing a shape memory polymer having a deformed shape in an environment at a first temperature, the shape memory polymer having a first glass transition temperature which is greater than the first temperature. The method also comprises decreasing the glass transition temperature of shape memory polymer from the first glass transition temperature to a second glass transition temperature which is less than or equal to the first temperature comprising contacting the shape memory polymer with an activation fluid which activation fluid may include, but is not necessarily limited to, methanol, aldehydes, amides, amines, carboxylic acids, esters, diketones, glycol ethers, carbohydrates, and combinations thereof. The activation fluid comprises a sugar present in an amount effective to raise a flash point of the activation fluid where the sugar is selected from the group consisting of fructose, galactose, glucose, lactose, maltose, sucrose, and combinations thereof. Further, the method additionally comprises expanding the shape memory polymer to deploy the shape memory polymer in a deployed shape.

In a different non-limiting embodiment there is provided a method for deploying a shape memory polymer in a downhole environment, comprising disposing a shape memory polymer having a deformed shape in the downhole environment which is at a first temperature. The method also comprises contacting the shape memory polymer with an activation fluid to decrease the glass transition temperature of the shape memory polymer below the first temperature, where the activation fluid includes but is not necessarily limited to methanol, aldehydes, amides, amines, carboxylic acids, esters, diketones, glycol ethers, carbohydrates, and combinations thereof. The activation fluid comprises a sugar present in an amount effective to raise a flash point of the activation fluid by at least 2° F. (1.1° C.) where the sugar is selected from the group consisting of fructose, galactose, glucose, lactose, maltose, sucrose, and combinations thereof. Additionally the method comprises expanding the shape memory polymer to a deployed shape and displacing the activation fluid to increase the glass transition temperature to greater than the first temperature and to maintain the shape memory polymer in the deployed shape.

Further there is provided in another non-restrictive version a system for deploying a shape memory polymer, comprising an activation fluid selected from the group consisting of methanol, aldehydes, amides, amines, carboxylic acids, esters, diketones, glycol ethers, carbohydrates, and combinations thereof, where the activation fluid comprises a sugar present in an amount effective to raise a flash point of the activation fluid where the sugar is selected from the group consisting of fructose, galactose, glucose, lactose, maltose, sucrose, and combinations thereof, and the system further comprises a shape memory polymer which is deployed by a decrease in its glass transition temperature in response to contact with the activation fluid.

BRIEF DESCRIPTION OF THE DRAWINGS

The following descriptions should not be considered limiting in any way.

DETAILED DESCRIPTION

Figure 1:
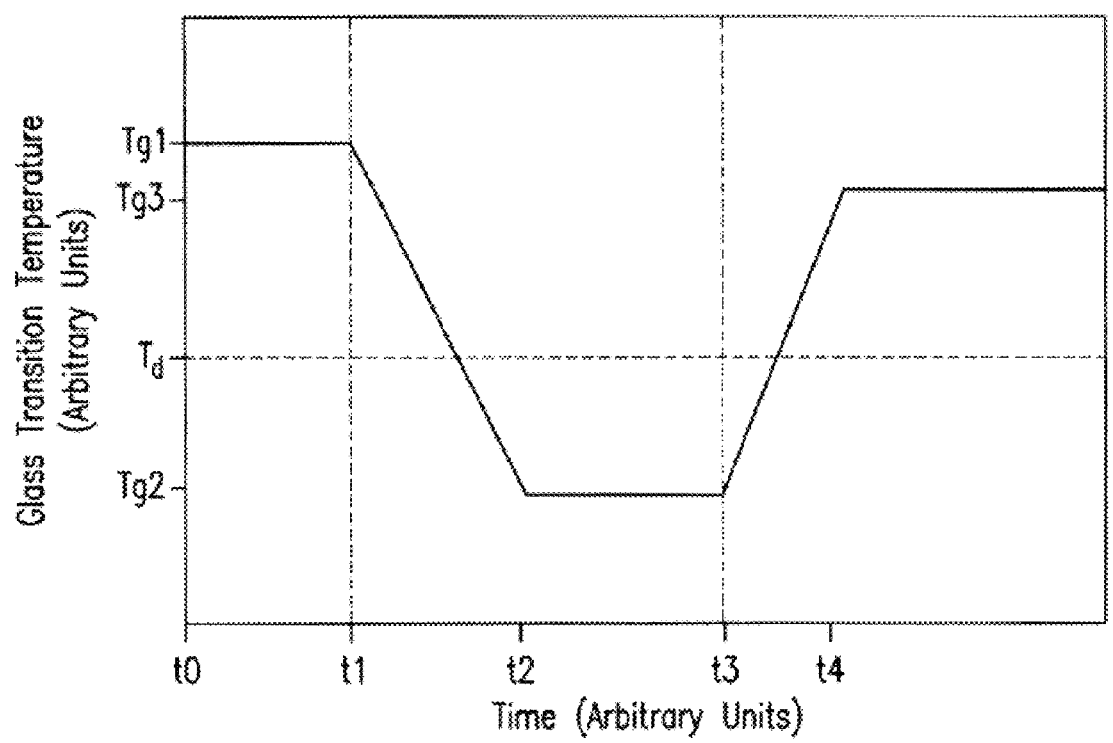
FIG. 1 is a graph showing glass transition temperature variation over time for a shape memory polymer.

It has been discovered that a shape memory polymer can be deployed (without increasing the temperature of its environment) by decreasing the glass transition temperature (Tg) of the shape memory polymer below the environment's temperature. In this manner, rapid and selective deployment of a downhole article that includes a shape memory polymer occurs by contact of such an article with an activation fluid to lower the Tg of the downhole article below the surrounding downhole temperature. It has also been discovered that a mechanical property of the shape memory polymer may be alternatively or simultaneously changed when the shape memory polymer is contacted with an activation fluid. The property changed includes, but is not necessarily limited to, a lower Young's modulus and/or increased toughness.

In one non-limiting embodiment, a shape memory polymer may be deployed from a deformed shape or compressed shape to an original shape by shape memory recovery due to contacting the shape memory polymer with an activation fluid that lowers the Tg of the shape memory polymer.

According to another non-restrictive version, the shape memory polymer may include, but is not necessarily limited to, a polyurethane, a polyurethane made by reacting a polycarbonate polyol with a polyisocyanate, a polystyrene, a polyethylene, an epoxy, a rubber, a fluoroelastomers, a nitrile, a polymer made from ethylene propylene diene monomers (EPDM), a polyamide, a polyurea, a polyvinyl alcohol, a vinyl alcohol-vinyl ester copolymer, a phenolic polymer, a polybenzimidazole, a polyethylene oxide/acrylic acid/methacrylic acid copolymer crosslinked with N,N'-methylene-bis-acrylamide, a polyethylene oxide/methacrylic acid/N-vinyl-2-pyrrolidone copolymer crosslinked with ethylene glycol dimethacrylate, a polyethylene oxide/poly(methyl methacrylate)/N-vinyl-2-pyrrolidone copolymer crosslinked with ethylene glycol dimethacrylate, combinations thereof. One non-limiting specific suitable shape-memory material includes the polyurethanes used in the GeoFORM™ conformable sand management system of Baker Hughes Incorporated.

According to a non-restrictive embodiment, a shape memory polymer includes a base polymer, for example polyurethane. The shape memory polymer can be an open cell foam or a solid, where the polymer is polyurethane. Unlike the open cell foam, the solid is substantially void-free and/or substantially devoid of interconnected structures that allow fluid communication through the solid. Polyurethane in general is a condensation product of a di- or polyisocyanate and a di- or polyhydroxy compound (also referred to as diol or polyol herein). A chain extender (e.g., chain extenders based on di- or polyamines), alternatively or in addition to diols, may be included in place of part of the diol charge to form the polyurethane. The diol, polyol, diisocyanate, polyisocyanate, chain extender, and other compounds that react to form the polyurethane are referred to collectively as reactive monomers.

Di- and polyhydroxy compounds may include, for example, diols and polyols having from 2 to 30 carbon atoms. Useful diols include, but are not necessarily limited to, glycols including oligomeric glycols having repeating alkyleneoxy units including di-, tri- and higher glycols, or polyglycols. Exemplary diols may include, but are not necessarily limited to, ethylene glycol, propylene glycol, trimethylene glycol, 1,3-butanediol, 1,4-butanediol, bishydroxymethyl cyclohexane, neopentylglycol, diethylene glycol, hexanediol, dipropylene glycol, tripropylene glycol, polypropylene glycol, triethylene glycol, polyethylene glycol, tetraethylene glycol, oligomeric and polymeric glycols such as polyethylene glycols, polypropylene glycols, polybutylene glycols, poly(ethylene-propylene) glycols, and the like. Combinations comprising at least one of the foregoing dihydroxy compounds can be used.

Exemplary suitable polyols include, but are not necessarily limited to, triols, for example glycerol, trimethylol propane, pentaerythritol, tris(2-hydroxy-ethyl) isocyanurate, and the like; tetrols such as dipentaerythritol; and other sugar alcohols such as inositol, myoinositol, sorbitol, and the like. Combinations comprising at least one of the foregoing polyhydroxy compounds may be used.

Polyurethanes may be typically prepared by the condensation of a diisocyanate with a diol. Aliphatic polyurethanes having at least two urethane moieties per repeating unit are useful, wherein the diisocyanate and diol used to prepare the polyurethane comprise divalent aliphatic groups that may be the same or different. The divalent aliphatic units may be C2 to C30, specifically C3 to C25, more specifically C4 to C20 alkylene groups, including straight chain alkylene, branched chain alkylene, cycloalkylene, heteroalkylene such as oxyalkylene (including polyetheralkylene), and the like. Exemplary aliphatic diradical groups include but are not limited to ethylene; 1,2- and 1,3-propylene; 1,2-, 1,3-, and 1,4-butylene; 1,5-pentamethylene; 1,3-(2,2-dimethyl)propylene; 1,6-hexamethylene; 1,8-octamethylene; 1,5-(2,2,4-trimethyl)pentylene, 1,9-nonamethylene; 1,6-(2,2,4-trimethyl)hexylene; 1,2-, 1,3-, and 1,4-cyclohexylene; 1,4-dimethylene cyclohexane; 1,11-undecamethylene; 1,12-dodecamethylene, and the like.

Monomeric diisocyanates may be used to prepare the polyurethane. The diisocyanate component may be a monomeric C4-20 aliphatic or C4-20 aromatic diisocyanate. Exemplary aliphatic diisocyanates include isophorone diisocyanate; dicyclohexylmethane-4,4'-diisocyanate; 1,4-tetramethylene diisocyanate; 1,5-pentamethylene diisocyanate; 1,6-hexamethylene diisocyanate; 1,7-heptamethylene diisocyanate; 1,8-octamethylene diisocyanate; 1,9-nonamethylene diisocyanate; 1,10-decamethylene diisocyanate; 2,2,4-trimethyl-1,5-pentamethylene diisocyanate; 2,2'-dimethyl-1,5-pentamethylene diisocyanate; 3-methoxy-1,6-hexamethylene diisocyanate; 3-butoxy-1,6-hexamethylene diisocyanate; ω,ω'-dipropylether diisocyanate; 1,4-cyclohexyl diisocyanate; 1,3-cyclohexyl diisocyanate; trimethylhexamethylene diisocyanate; and combinations comprising at least one of the foregoing.

Exemplary aromatic polyisocyanates include, but are not necessarily limited to, toluene diisocyanate, methylene bis-phenylisocyanate (diphenyl-methane diisocyanate), methylene bis-cyclohexylisocyanate (hydrogenated MDI), naphthalene diisocyanate, and the like.

Polymeric or oligomeric diisocyanates may also or alternatively be used to prepare a polyurethane or a urethane- or urea-linked copolymer. Exemplary oligomeric or polymeric chains for the polymeric diisocyanates include, but are not necessarily limited to, polyurethanes, polyethers, polyester, polycarbonate, polyestercarbonates, and the like. In one non-limiting embodiment, the polyisocyanate is a polymeric polyisocyanate, such as a polymer chain with terminal isocyanate groups. Useful polyisocyanates include, but are not necessarily limited to, those based on polyesters such as polyaliphatic esters including polylactones, polyarylate esters including copolymers of phthalates with phenols such as bisphenol A, dihydroxybenzenes, and the like; and poly (aliphatic-aromatic) esters such as ethylene terephthalate, butylene terephthalate, and the like.

A useful class of polyaliphatic ester-based diisocyanates is based on polylactones such as polybutyrolactones, polycaprolactones, and the like. Exemplary polyester-diisocyanates based on these polyesters include, but are not necessarily limited to, ADIPRENE® LFP 2950A and PP 1096, available from Chemtura, which are p-phenylene diisocyanate (PPDI)-terminated polycaprolactone prepolymers.

Alternatively or in addition to a dihydroxy compound, the diisocyanate may be condensed with a diamine, sometimes referred to as a chain extender. It will be appreciated that condensation of a diisocyanate with a dihydroxy compound produces a urethane linkage in the polymer backbone, whereas the condensation of diisocyanate with the diamine produces a urea linkage in the polymer backbone. Exemplary chain extenders include, but are not necessarily limited to, C4-30 diamines. The diamines may be aliphatic or aromatic. In a specific embodiment, useful diamines include aromatic diamines including, but not necessarily limited to, 4,4'-bis(aminophenyl)methane, 3,3'-dichloro-4,4'-diaminodiphenyl methane (also referred to as 4,4'-methylene-bis(o-chloroaniline), abbreviated MOCA), dimethylsulfidetoluene diamine (DADMT), and the like.

In another non-limiting embodiment, an open cell foam having a base polymer of polyurethane is formed by combining, for example, a diisocyanate and diol described herein. A blowing agent may be included to produce the pores for the open cell foam. According to an embodiment, a blowing agent such as water is included with the diol to provide a foam structure due to generation of carbon dioxide from the reaction between diisocyanate and water when the diisocyanate is combined with the water and diol. Alternatively the foam can be formed by other chemical or physical blowing agents. Examples of the blowing agent include, but are not necessarily limited to, hydrochlorofluorocarbons (e.g., methylene chloride, tetrafluoroethylene, pentafluoropropane, heptafluoropropane, pentafluorobutane, hexafluorobutane, and dichloromonofluoroethane), hydrocarbons (for example, pentane, isopentane, and cyclopentane), carbon dioxide, acetone, and water.

In a further non-restrictive version, the pores for the open cell foam can be produced by placing the above components in a vacuum chamber and decreasing the pressure below the internal pressure of the forming polyurethane to cause out-gassing of the polymer material.

The density of the foam may be controlled by the amount of water or blowing agent added. The amount of water can be about 0.5 weight percent (wt %) independently to about 5.0 wt %, alternatively about 0.5 wt % independently to about 4.0 wt %, and more in another non-limiting version from about 0.5 wt % independently to about 3.0 wt %, based on the weight of the diol (or polyol). It will be appreciated that the use of the word "independently" with respect to a range herein means that any suitable lower threshold may be used together with any upper threshold to form another suitable, alternative range. Alternatively or additionally, physical blowing agents can be used in amount about 0.5 wt % independently to about 15 wt %, and alternatively about 0.5 wt % independently to about 10 wt %, based on the combined weight of the diol (or polyol) and diisocyanate (or polyisocyanate). In another non-limiting embodiment, physical blowing agents, such as carbon dioxide, can be used in combination with water as a blowing agent.

According to another non-restrictive version, the composition containing the reactive monomers may be mixed for a time (e.g., about 20 seconds) and then disposed in a mold, which may be immediately closed by placing a top metal plate on the mold. Due to the significant amount of pressure generated by the foam-forming process, a clamp may be used to hold the top metal plate and mold together to prevent leakage of the foam material from the mold. After about 2 hours, the polyurethane foam material is sufficiently cured such that it can be removed from the mold, i.e., de-molded. Before de-molding, the mold may be cooled below the glass transition temperature of the polymer to fix the shape. Thereafter, in one specific embodiment, the polyurethane foam material may be post-cure treated at a temperature of about 100° C. for about 6 hours so that the polyurethane foam material reaches its full strength. Once de-molded, the material is a shape memory polymer in an original shape.

More details about these particular polyurethane foams or polyurethane elastomers may be found in U.S. Pat. No. 7,926,565 incorporated herein by reference in its entirety. Other details about polyurethane shape-memory material may be found in U.S. Pat. Nos. 7,318,481; 7,828,055 and 8,353,346 assigned to Baker Hughes Incorporated, all of which are incorporated herein by reference in their entirety.

The polyurethane foam material may have a layer of "skin" on the outside surface of the polyurethane. The skin is a layer of solid polyurethane formed when the mixture containing reactive monomers contacts the mold surface. The thickness of the skin can depend on the concentration of water added to the mixture. Excess water content decreases the thickness of the skin, and insufficient water content increases the thickness of the skin. The formation of the skin is believed to be due to the reaction between the isocyanate in the mixture and the moisture on the mold surface. Therefore, additional mechanical conversion processes may be used to remove the skin. Tools such as band saws, miter saws, hack saws, and hot filament wire saws can be used to remove the skin. After removing the skin from the polyurethane foam material, it will have a full open cell structure, excellent elasticity, and very good tear strength. In the case where the polyurethane has an outer skin that needs to be removed, the mold can be sufficiently sized to take into account material loss due to removal of the skin.

As an alternative to the open cell foam, the polyurethane may be a solid without the interconnecting pores characteristic of an open cell foam. Here, for example, the reactive monomers may be combined without addition of a blowing agent, and the components are molded and then de-molded as described above to produce a shape memory polymer in an original shape that is solid.

The shape memory polymer after de-molding has not only an original shape but an original glass transition temperature (Tg), which is a physical characteristic of the material. According to a non-limiting embodiment, once the polyurethane shape memory polymer has been de-molded in its original shape, the shape memory polymer may be heated to a temperature greater than or close to its Tg and a deformation or compression stress may be applied to the shape memory polymer to reshape the shape memory polymer into a deformed or compressed shape. The shape memory polymer may then be cooled below its Tg with the deformation stress still applied to the shape memory polymer. Upon cooling below the Tg of the shape memory polymer, the shape memory polymer is fixed in the deformed shape even with removal of the deformation stress. To return to the original shape, the shape memory polymer may again be heated to a temperature greater than or close to its Tg.

Alternative to heating the shape memory polymer for shape recovery, a method for deploying the shape memory polymer includes disposing a shape memory polymer having a deformed shape in an environment at a first temperature (the shape memory polymer has a first glass transition temperature which is greater than the first temperature); decreasing the glass transition temperature of shape memory polymer from the first glass transition temperature to a second glass transition temperature that is less than or equal to the first temperature; and expanding the shape memory polymer to deploy the shape memory polymer in a deployed shape. In a non-limiting embodiment, the shape memory polymer may be a polyurethane. Further, the shape memory polymer may be an open cell foam or a solid. Decreasing the glass transition temperature of the shape memory polymer includes contacting the shape memory polymer with an activation fluid.

The glass transition temperature is a physical property of the shape memory polymer and depends in part on the interaction of the component polyurethane chains. Strong interactions among the polyurethane polymer chains lead to a greater glass transition temperature. In contrast, weaker interactions among the polyurethane polymer chains produce a smaller value for the glass transition temperature. It should be recognized that the aggregate strength of the interactions provides the glass transition temperature of the polyurethane. Thus, selection of the reactive monomers influences the glass transition temperature since the reactive monomers become part of the polymer matrix. The glass transition temperature of the polyurethane is about 90° C. independently to about 170° C., alternatively about 95° C. independently to about 160° C., and in another non-limiting embodiment from about 100° C. independently to about 150° C. As will be discussed, the glass transition temperature of the polyurethane may be decreased by contact with the activation fluid so that the transition glass temperature decreases by about 5° C. independently to about 70° C., alternatively by about 10° C. independently to about 60° C. The depression of the glass transition temperature may be temporary and last for as long as the activation fluid is present among the polyurethane chains. Further, as should be appreciated, a shape memory polymer made of polyurethane will have substantially the same glass temperature and decreased glass temperature as the polyurethane.

According to an embodiment, the shape memory polymer may be contacted with an activation fluid to lower the glass transition temperature of the shape memory polymer. The activation fluid may include brine, solvent, and alcohol. Additionally, the activation fluid may optionally include a sugar.

More specifically, the activation fluid may include, but is not necessarily limited to, methanol, aldehydes, amides, amines, carboxylic acids, esters, diketones, glycol ethers, carbohydrates, and combinations thereof. In one non-limiting embodiment the activation fluid has an absence of methanol. Suitable diketones include, but are not necessarily limited to, diacetyl, acetyl acetone, hexane-2,5-dione, and combinations thereof. Suitable glycol ethers include, but are not necessarily limited to, diethylene glycol monoethyl ether acetate, diethylene glycol monobutyl ether acetate, 1-ethoxyethyl acetate, propylene glycol methyl ether acetate, and combinations thereof.

Each of these activation fluids, alone or in combination, has a flash point. The lower the flash point, the more volatile the fluid is and the more hazardous it is to handle. Thus, it is desirable to raise the flash point of the activation fluid and it has been discovered that this may be done by adding a sugar in an amount effective to raise the flash point of the fluid. Suitable sugars include, but are not necessarily limited to, monosaccharides and disaccharides including, but not necessarily limited to, fructose, galactose, glucose, lactose, maltose, sucrose, and combinations thereof. It should be noted that the sugars are different from the activation fluids, for instance where the activation fluid is a carbohydrate.

In one non-limiting embodiment the flash point of the activation fluid is raised by at least 2° F. (1.1° C.); alternatively by at least 5° F. (2.8° C.); in another non-restrictive version at least 10° F. (5.6° C.). In one non-limiting embodiment the amount of sugar added to the activation fluid ranges from about 0.5 independently to about 20 wt %; alternatively from about 5 independently to about 15 wt %, and in another non-restrictive version alternatively from about 7 independently to about 12 wt %.

The activation fluid may alternatively or additionally contain solvent, which is also referred to as a mutual solvent because the solvent is miscible with more than one class of liquids. In particular, a mutual solvent can be soluble in hydrophobic and hydrophilic liquids, for example, hydrocarbon fluids and aqueous solutions. The solvent is different from the activation fluid; that is, they cannot be the same chemical.

More specifically, suitable ketones include, but are not limited to, 2-butanone, 2-pentanone, 3-pentanone, acetone, hydroxyacetone, 4-hydroxy-2-butanone, 1-hydroxy-2-butanone, acetylacetone, methyl ethyl ketone, and combinations thereof. Suitable carboxylic acids include, but are not necessarily limited to, dicarboxylic acids and/or tricarboxylic acids. Suitable dicarboxylic acids include, but are not necessarily limited to, oxalic acid, malonic acid, succinic acid, glutaric acid, adipic acid, pimelic acid, suberic acid, azelaic acid, and/or sebacic acid.

Suitable mutual solvents include but are not necessarily limited to substituted and unsubstituted glycols of the formula $R^1O(CH_2CHR^2O)_nR^3$, wherein $R^1$, $R^2$, and $R^3$ are independently hydrogen, alkyl group, aryl group, and acetyl group, and n is about 1 to about 10. In another non-limiting embodiment, the alkyl group, aryl group, and acetyl group may have 1 to about 6 carbon atoms, alternatively 1 to about 4 carbon atoms; and in a different non-restrictive version 1 to about 2 carbon atoms; n is 1 to about 10, alternatively 1 to about 6, and in another non-limiting embodiment 1 to about 3.

Examples of substituted and unsubstituted glycols include, but are not necessarily limited to, glycols such as ethylene glycol, propylene glycol, butylene glycol, hexylene glycol, di-propylene glycol, diethylene glycol, tripropylene glycol, triethylene glycol, and poly glycols; glycol ethers such as ethylene glycol monomethyl ether (EGMME), ethylene glycol monoethyl ether (EGMEE), ethylene glycol monopropyl ether (EGMPE), ethylene glycol monoisopropyl ether, ethylene glycol monobutyl ether (EGMBE), ethylene glycol monophenyl ether, ethylene glycol monobenzyl ether, diethylene glycol monomethyl ether (DEGMME), diethylene glycol monoethyl ether (DEGMEE), diethylene glycol mono-n-butyl ether (DEGMBE), and dipropylene glycol monomethyl ether (DPGMEE); dialkyl ethers such as ethylene glycol dimethyl ether (EGDME), ethylene glycol diethyl ether (EGDEE), and ethylene glycol dibutyl ether (EGDBE); and esters such as ethylene glycol methyl ether acetate (EGMEA), ethylene glycol monoethyl ether acetate (EGMEEA), and ethylene glycol monobutyl ether acetate (EGMBEA). Combination comprising at least one of the foregoing can be used.

In one non-limiting embodiment, the solvent may be a glycol ether wherein $R^1$ and $R^2$ are both hydrogen; $R^3$ is an alkyl group including methyl, ethyl, propyl, isopropyl, and butyl groups; and n is 1. In another embodiment, the solvent may be ethylene glycol monomethyl ether (EGMME), and may alternatively be ethylene glycol monobutyl ether (EGMBE). Such solvents are available from, for example, Union Carbide Corporation.

Other suitable solvents include, but are not necessarily limited to, amides of the formula $R^4CONR^5R^6$, wherein $R^4$, $R^5$, and $R^6$ are independently a C1-C5 alkyl group or C1-C5 alkenyl group, and any two of $R^4$-$R^6$ can cyclize together to form a cycle as in 1-methyl-2-pyrrolidinone. Examples of amide solvents include but are not limited to N,N-dimethylformamide, N,N-diethylformamide, N,N-dimethylacetamide, N,N-diethylacetamide, N,N-dimethylpropionamide, N,N-dimethylbutyramide, 1-methyl-2-pyrrolidinone, and 1-ethyl-2-pyrrolidinone. Such amides are commercially available from, for example, Sigma-Aldrich.

The solvent is not particularly limited and can be any one or a combination comprising at least one of the foregoing solvents as long as the activation fluid is miscible therein to an appreciable extent.

The activation fluid may also additionally or alternatively contain an alcohol. The alcohol may be linear or branched. In an embodiment the alcohol is a C1-C10 alcohol, including monohydric and polyhydric alcohols. Examples of the monohydric alcohol include, but are not necessarily limited to, methanol, ethanol, n-propanol, isopropanol, n-butanol, 2-butanol, isobutanol, tert-butanol, n-pentanol, isopentanol, 2-pentanol, hexanol, octanol, isooctanol, cyclohexanol, 2-methyl-1-butanol, 2-methyl-1-pentanol, 3-methyl-2-butanol, 2-ethylhexanol and combinations of these. Other alcohols include, but are not necessarily limited to, polyhydric alcohols such as diols, triols, and polyols, including ethylene glycol, propylene glycol, 1,3-propanediol, 1,4-butanediol, 1,2,4-butanetriol, glycerin, erythritol, and the like. Combinations of the foregoing may be used.

The amount of the optional solvent, optional alcohol and/or optional brine, in the activation fluid depends on the conditions and characteristics of the downhole environment as well as the desired amount and/or rate of expansion of the shape memory polymer. The alcohol may be present in the activation fluid in an amount of about 2 weight percent (wt %) independently to about 98 wt %, alternatively about 10 wt % to about 90 wt %, and in one non-limiting embodiment from about 30 wt % independently to about 70 wt %, based on the weight of the activation fluid. The solvent may be present in the composition in an amount from about 0.05 wt. % independently to about 90 wt. %, alternatively from about 0.1 wt. % independently to about 50 wt. %, and in another non-limiting embodiment from about 1 wt. % independently to about 20 wt. %, based on the weight of the activation fluid. Again, it will be appreciated that the activation fluid may be pure or 100% of the noted possibilities, or alternatively may only be optionally diluted with water or brine, or an oil, and oil-based mud, a water-based mud or an emulsion-based mud. The brine may be present in the activation fluid in an amount of about 20 wt % independently to about 99 wt %, alternatively from about 30 wt % independently to about 90 wt %, and in a different non-limiting embodiment from about 40 wt % independently to about 80 wt %, based on the weight of the activation fluid.

Besides water and brine, other diluents may include, but are not necessarily limited to, water-based muds, oils, oil-based muds, emulsion-based muds. Suitable oils may include, but are not necessarily limited to diesel, and LVT 200, diesel oil, LVT-200 oil, poly-olefin oils, synthetic as well as natural paraffin oils, and the like.

According to a non-limiting embodiment, the optional solvent is different than the optional alcohol in the activation fluid. In another embodiment, the solvent and the alcohol are the same in the activation fluid. In a specific embodiment, the activation fluid includes brine, EGMBE, and/or methanol. More particularly, the activation fluid may contain about 50 volume percent (vol %) to about 99 vol % brine, about 1 vol % to about 50 vol % EGMBE, and about 1 vol % to about 25 vol % methanol, based on the density of the activation fluid.

The brine, solvent, and/or alcohol may be combined together as a composition, or the individual components can be used separately as the activation fluid in one non-limiting embodiment. Alternatively, two of the components can be combined while the third is combined to the two-component composition at a later time, such as upon introduction of the activation fluid downhole. In one non-limiting embodiment, the density of the activation fluid ranges from about 8 pounds per gallon (ppg) independently to about 20 ppg (about 0.96 to about 2.4 kg/L), alternatively from about 9 ppg independently to about 16 ppg (about 1.1 to about 1.9 kg/L), and in another non-limiting embodiment about 10 ppg independently to about 15 ppg (about 1.2 to about 1.8 kg/L).

Without wishing to be bound by theory, it is believed that the activation fluid lowers the (original) glass transition temperature of the shape memory polymer through a plasticization process. The activation fluid includes low molecular weight compounds that are smaller than the polyurethane chains of the shape memory polymer; thus, the constituents of the activation fluid can penetrate and interact with the polyurethane polymer chain molecules, which may reduce the cohesive forces between the polymer chains. Consequently, the glass transition temperature is decreased from its original value due to an increase in the chain segment mobility. Once the activation fluid is removed or the concentration of the activation fluid begins to decrease, the Tg of the shape memory polymer increase towards its original value prior to contact with the activation fluid. Hence, the effect of the activation fluid on the Tg of the shape memory polymer may be temporary. Moreover, the glass transition temperature may not fully recover to its original value (before contact with activation fluid) but may instead be slightly lower than the original value of the glass transition temperature.

FIG. 1 shows variation of the glass transition temperature over time for a shape memory polymer. The shape memory polymer is initially in an environment at a first temperature Td, has a deformed shape at time t0, and has first glass transition temperature Tg1. The first glass transition temperature Tg1 is greater than the first temperature Td, i.e., Td<Tg1. It should be noted that with respect to FIG. 1, the first temperature Td is not changed although slight variations in Td can be expected. At time t1, an activation fluid contacts the shape memory polymer, and the glass transition temperature begins to decrease from the first glass transition temperature Tg1 until the shape memory polymer attains a second glass transition temperature Tg2 (at time t2), with Tg2<Td<Tg3. As the glass transition temperature decreases below Td, the shape memory polymer begins to actuate from its deformed shape to its original shape. At time t3, the activation fluid is displaced from the shape memory polymer, and the glass transition temperature begins to increase from the second glass transition temperature Tg2 to the third glass transition temperature T3. As the glass transition temperature becomes greater than Td, the original shape becomes fixed again in the shape memory polymer. At time t4 and greater, the shape memory polymer reaches its third glass transition temperature Tg3 and remains in the fixed original shape. As shown in FIG. 1, the third glass transition temperature Tg3 may be less than the first glass transition temperature Tg1. In an embodiment, the third glass transition temperature Tg3 is less than or equal to the first glass transition temperature Tg1.

Thus, the polyurethane shape memory polymer can recover its original shape upon contact with the activation fluid by virtue of a decrease in its transition glass temperature. Therefore, thermal activation of the shape memory effect can be avoided. Shape recovery by activation fluid described herein can significantly decrease the glass transition temperature of the polyurethane shape memory polymer. Instead of heating the shape memory polymer to a temperature greater than or about equal to its original Tg to actuate from the deformed shape to the original shape, shape recovery to the original shape can occur by contact with activation fluid to decrease the Tg of the polyurethane.

In an embodiment, the first glass transition temperature of the shape memory polymer may be from about 80° C. independently to about 160° C., alternatively about 90° C. to about 150° C., and in another non-limiting embodiment about 100° C. independently to about 150° C. The second glass transition temperature may be about 30° C. independently to about 120° C., alternatively about 35° C. independently to about 110° C., and in another non-limiting embodiment about 40° C. independently to about 100° C. The second glass transition temperature may be from about 5° C. independently to about 80° C., alternatively about 10° C. independently to about 70° C., and in another non-limiting embodiment from about 10° C. independently to about 60° C. less than the first glass transition temperature. The third glass transition temperature may be from about 60° C. independently to about 160° C., alternatively about 70° C. independently to about 165° C., and in a different non-limiting embodiment about 80°. independently to about 150° C. Additionally, the first temperature (i.e., the temperature of the environment that the shape memory polymer is in) may be about 35° C. independently to about 110° C.

The shape memory polymers described herein can be used in diverse applications and are well-suited for downhole applications. The shape memory polymers may be initially molded into an original shape for use as, for example, a packer, a sandscreen, a blowout preventer element, a submersible pump motor protector bag, a sensor protector, a sucker rod, an O-ring, a T-ring, a gasket, a sucker rod seal, a pump shaft seal, a tube seal, a valve seal, a seal for an electrical component, an insulator for an electrical component, a seal for a drilling motor, a seal for a drilling bit, or other downhole elements. Before running the article downhole, the article is deformed above the Tg of the shape memory polymer, and fixed into the deformed shape upon cooling below the Tg.

In an embodiment, a method for deploying a shape memory polymer in a downhole environment includes disposing the shape memory polymer having a deformed shape in the downhole environment that is at a first temperature. The shape memory polymer can be a downhole element, e.g., a packer or sandscreen. The method further includes contacting the shape memory polymer with an activation fluid to decrease the glass transition temperature of the shape memory polymer below the first temperature; expanding the shape memory polymer to a deployed shape; and displacing the activation fluid to increase the glass transition temperature to greater than the first temperature and to maintain the shape memory polymer in the deployed shape. According to a non-limiting embodiment, displacing the activation fluid includes replacing the activation fluid with a production fluid, which can be a fluid produced from the downhole environment such as a hydrocarbon, hydrocarbon-containing fluid, aqueous fluid, or a combination comprising at least one of the foregoing.

Figure 2:
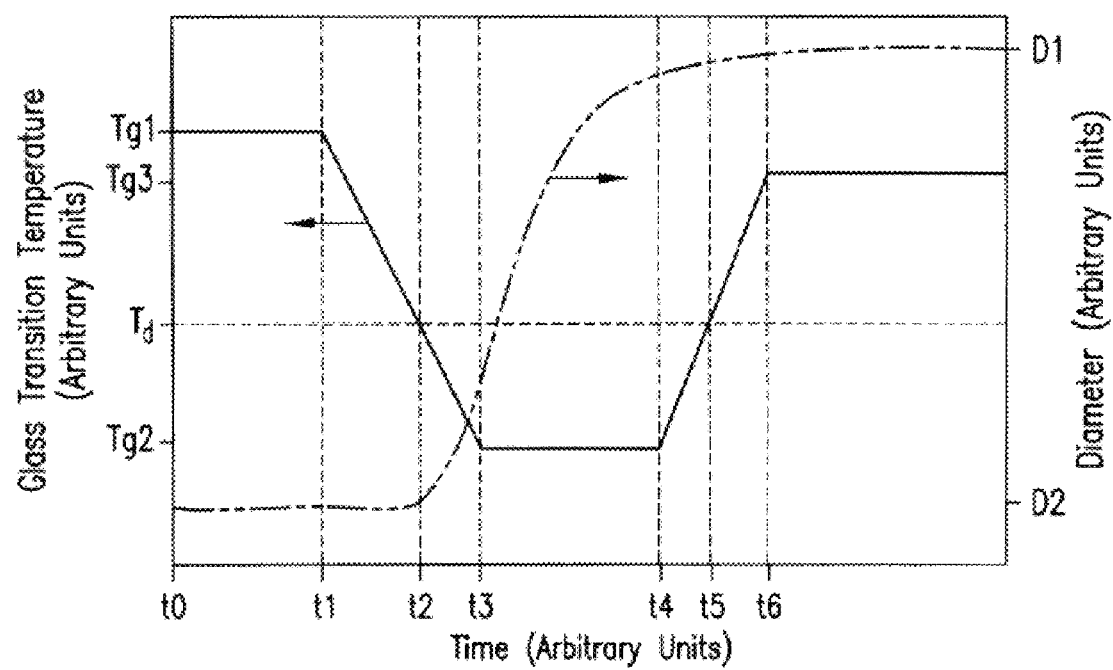
FIG. 2 is a graph showing a diameter size change of a shape memory polymer with respect to a change in its glass transition temperature.

FIG. 2 shows the progression of downhole deployment of a shape memory polymer (SMP), e.g., a packer. The downhole environment (e.g., a borehole) has a temperature Td. The SMP in a deformed shape (with outer diameter D2) is disposed in the downhole environment at time t0. The SMP has a first glass transition temperature Tg1>Td. At time t1, the activation fluid contacts the SMP, and the glass transition temperature begins to decrease from Tg1. At time t2, the glass transition temperature of the SMP is about equal to Td so that the SMP begins to expand from the deformed shape, i.e., the diameter increases to values greater than D2. At time t3, the glass transition temperature has decreased from the first glass transition temperature Tg1, to the second glass transition temperature Tg2, and the SMP continues to expand. At time t4, downhole fluids (e.g., hydrocarbons) are produced, and the activation fluid is displaced (or decreased) from the SMP so that the glass transition temperature begins to increase from Tg2 while expansion of the SMP continues (unless it has reached its original shape or has contacted the borehole wall or casing in the borehole). At time t5, the glass transition temperature of the SMP is about equal to Td, and expansion (if still occurring) of the SMP begins to decrease. At time t6, the SMP reaches its third glass transition temperature Tg3, and the SMP is fixed in the original shape, sealing the borehole if used a packer. By time t6, the SMP is deployed in the downhole environment. Although FIG. 2 shows Tg3<Tg1, the first glass transition temperature Tg1 may be equal to or greater than the third glass transition temperature Tg3. In other words, the final glass transition temperature can be less than or equal to the original glass transition temperature, and the intermediate glass transition temperature (Tg2 in FIG. 2) is less than both the original and final glass transition temperatures of the SMP. It will be appreciated that the glass transition temperature of the SMP is temporarily decreased below Td by the presence of the activation fluid, and the decrease of the glass transition temperature to the intermediate value (Tg2 in FIG. 2) is not permanent.

In another non-limiting embodiment, the shape memory packer is deformed or compressed (for disposal and location downhole) to have a volume that is about 60% independently to about 5%, alternatively about 50% independently to about 10%, and in another non-restrictive version to about 40% independently to about 20% less than the volume of the original shape. In another non-limiting embodiment, the shape memory packer may be compressed or deformed to have an outer diameter that is about 50% independently to about 5%, alternatively about 40% independently to about 5%, and in another non-limiting embodiment about 30% independently to about 5% less than outer diameter of the original shape.

In a different, non-restrictive embodiment, the shape memory polymer recovers at least about 80% of its original size, alternatively at least about 90%, and in another non-limiting embodiment at least about 99% of its original size. As used herein, "size" of the shape memory polymer refers to a linear dimension of a working portion of the shape memory polymer. That is, if the shape memory polymer is used as a packer to seal a borehole, then the outer diameter is the working portion of the shape memory polymer, and the outer diameter (OD) would recover at least about 80% of its original size, alternatively at least about 90%, and more in another non-limiting embodiment at least about 99% of its original size.

According to a non-limiting embodiment, the rate of expansion of the shape memory polymer from the deformed shape to the original shape is at least about 0.3 millimeters per hour (mm/hr) independently to about 12 mm/hr, alternatively about 0.4 mm/hr independently to about 10 mm/hr, and in a different non-limiting embodiment about 0.4 mm/hr independently to about 8 mm/hr.

The amount of the activation fluid used to lower the glass transition temperature below the downhole temperature depends on a number of factors such as the density and porosity of the shape memory polymer and downhole properties such as temperature and pressure. Therefore, the activation fluid is present in an amount effective to lower the transition glass temperature of the shape memory polymer below the downhole temperature. In another non-limiting embodiment, the amount of activation fluid ranges from about 0.5 independently to about 100 vol % of the shape memory polymer, alternatively from about 0.5 independently to about 20 vol %, in a different non-restrictive version from about 1 independently to about 10 vol %, and in another non-limiting embodiment from about 3 independently to about 8 vol %. Alternatively, the volume ratio of activation fluid to shape memory polymer ranges from about 1000:1 to about 75:1, alternatively from about 4:1 to about 0.01:1, or in another non-limiting embodiment from about 1000:1 to about 0.01:1. In an alternative, non-restrictive version, the activation fluid may be in steam or vapor form, and thus there is much less activation fluid compared to the shape memory polymer. In one non-limiting embodiment, the activation fluid is pumped from the surface into the target zone to temporarily lower the transition glass temperature of the shape memory polymer to deploy the shape memory polymer to its original shape.

In another non-limiting embodiment the exposure time of the shape memory polymer may range from about instantaneously independently to about one year, alternatively from about 1 hour independently to about 14 days, and in another non-limiting embodiment from about 6 hours independently to about 5 days.

Thus, in another non-limiting embodiment, a system for deploying a shape memory polymer may include an activation fluid comprising a brine, solvent, and/or other activation fluid noted elsewhere containing a sugar to raise its flash point, and a shape memory polymer which is deployed by a decrease in its glass transition temperature in response to contact with the activation fluid. In the system, the shape memory polymer may be an open cell foam including polyurethane, and the shape memory polymer actuates from a deformed shape to a deployed shape. Alternatively, the shape memory polymer may be a solid including polyurethane and actuates from a deformed shape to a deployed shape.

The activation fluid may also change a mechanical property of the shape memory polymer. The changed property includes, but is not necessarily limited to, lowering Young's modulus, increasing toughness, and both simultaneously.

The above embodiments will now be described with respect to particular embodiments of the invention which are not intended to limit the invention in any way, but which are simply to further highlight or illustrate the invention.

Deformed or Compressed Shape Memory Polymer

A shape memory polymer (SMP) having open cell polyurethane foam was fabricated by combining MDI (isocyanate), polycarbonate polyol, and water in a mold and held at a temperature above the Tg for 18 hours. The mold was cooled to room temperature, and the SMP was de-molded in an original shape. Subsequently, the SMP was placed in a cylinder and heated to a temperature above or close to the Tg of the SMP). The SMP was deformed by compressing the SMP between two plates in the cylinder to obtain a deformed shape having 25% of the volume of the original shape. The cylinder was cooled to room temperature, and the SMP removed from the cylinder to produce the SMP in the deformed shape.

Shape Memory Recovery

The SMP in the deformed shape was placed in a container, and the container was filled with an activation fluid. Data for the expansion of the SMP were acquired at the indicated temperatures by placing a linear potentiometer on the top surface of the SMP and recording the expansion of the SMP by the displacement of the linear potentiometer as a function of time.

Figure 3:
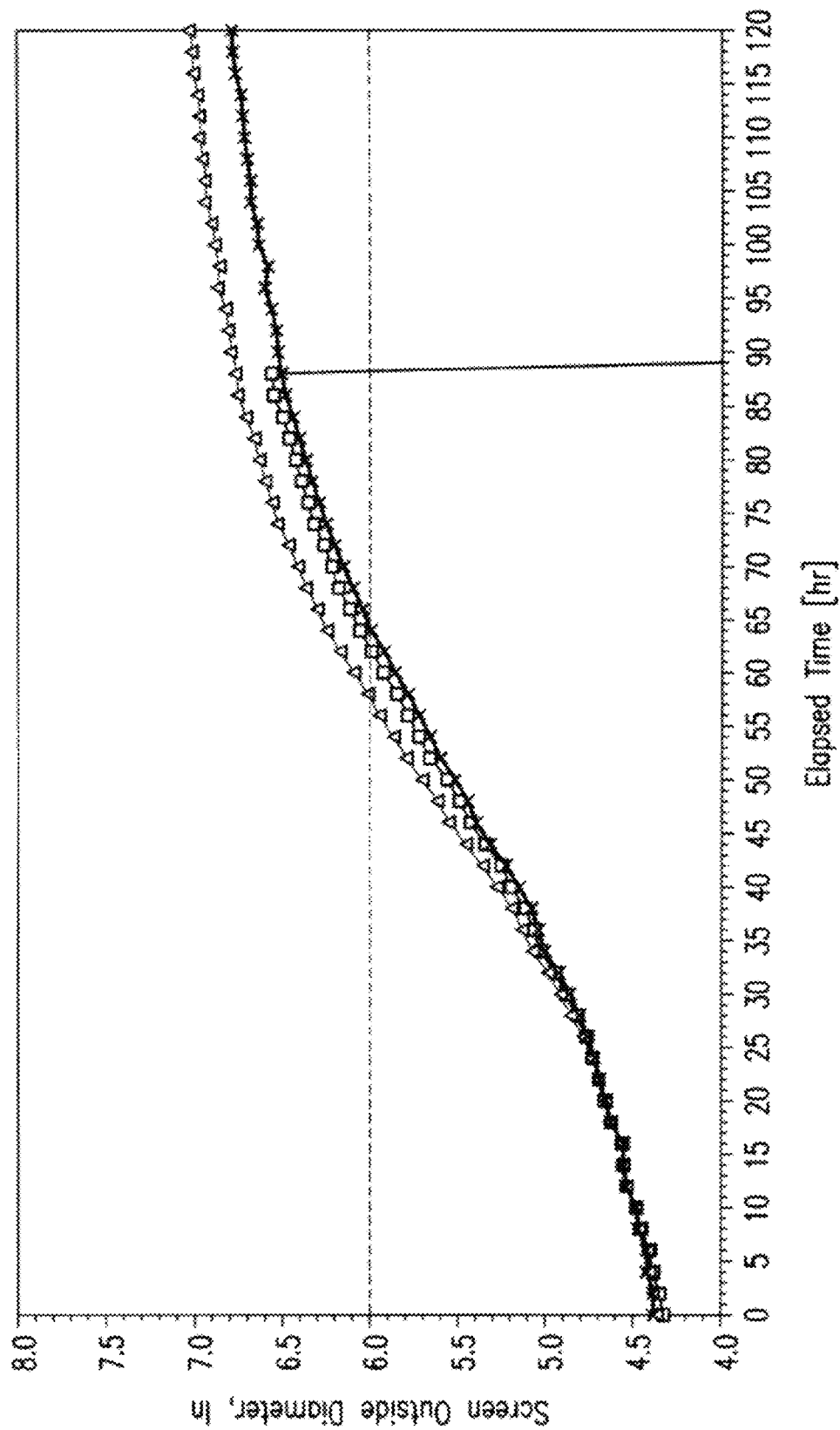
FIG. 3 is a graph of size versus time for a shape memory polymer in contact with an activation fluid at 105° F. (40.5° C.)
Figure 4:
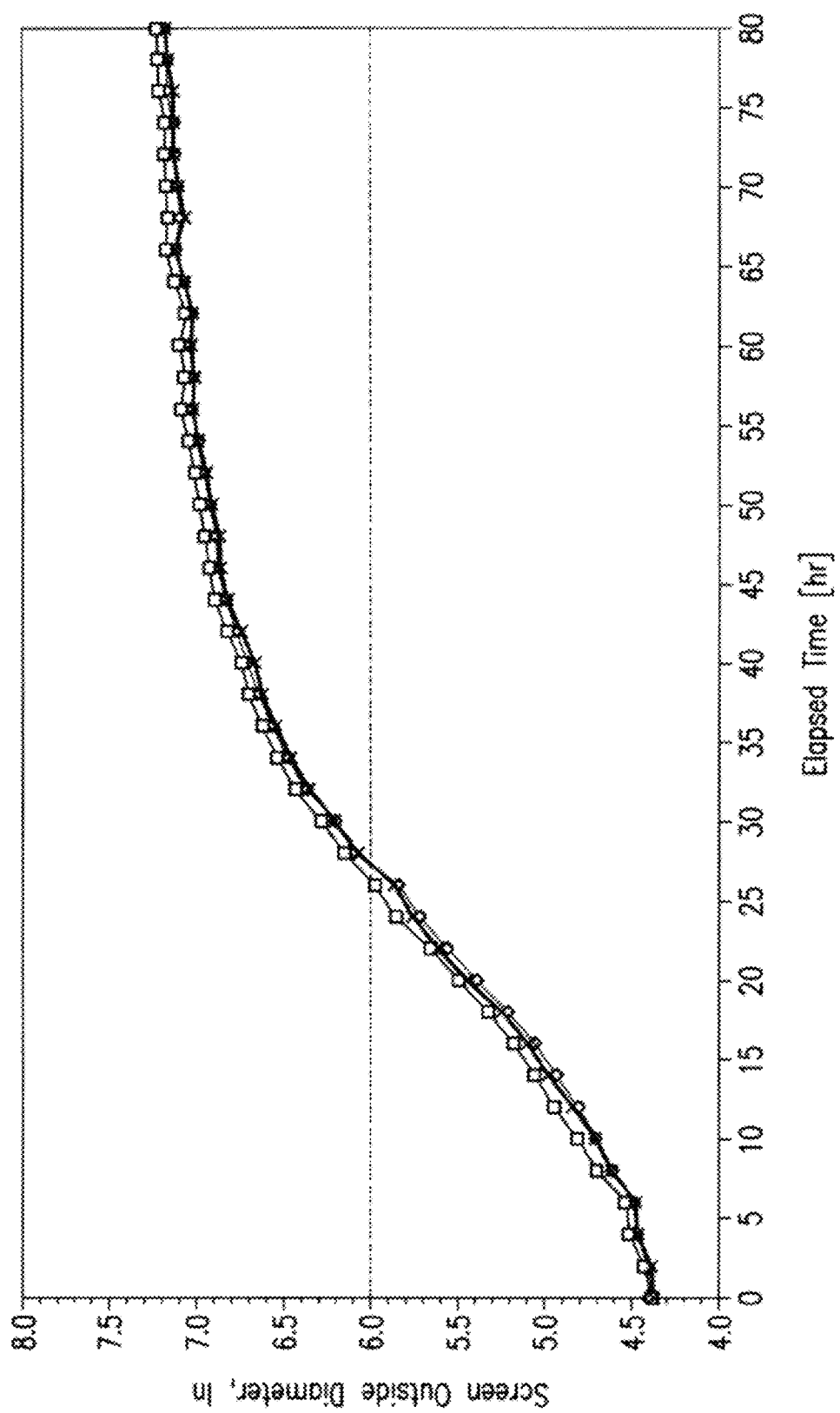
FIG. 4 is a graph of size versus time for a shape memory polymer in contact with an activation fluid at 110° F. (43.3° C.)
Figure 5:
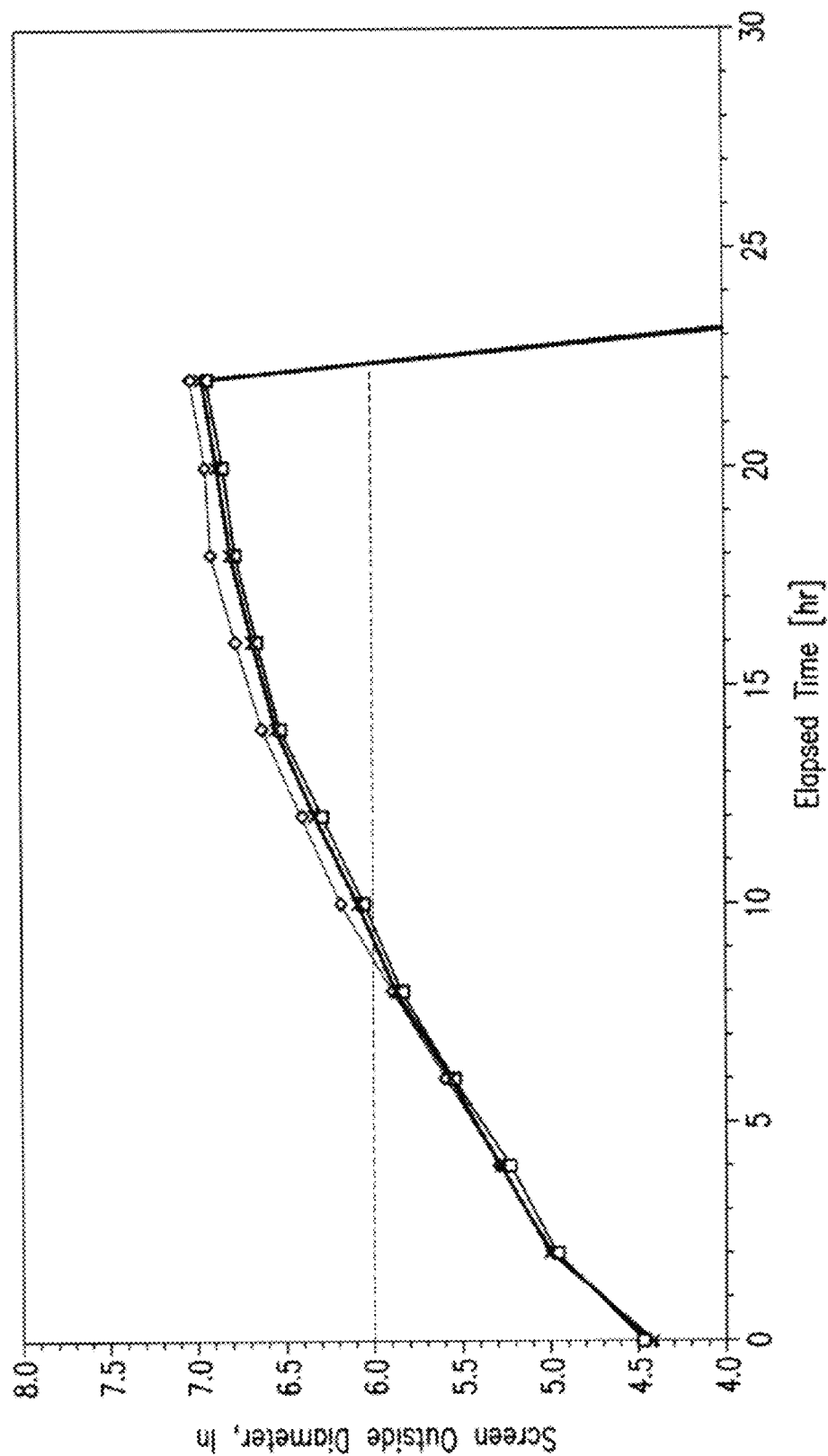
FIG. 5 is a graph of size versus time for a shape memory polymer in contact with an activation fluid at 115° F. (46.1° C.)

For FIGS. 3-5, the activation fluid included 65 volume percent (vol %) sodium bromide, 25 vol % methanol, and 10 vol % ethylene glycol monobutyl ether (EGMBE). The density of the activation fluid was 10.7 pounds per gallon (ppg) (1.28 kg/L). Data for the expansion of the SMP were acquired at temperatures of 105° F. (40.6° C.), 110° F. (43.3° C.), and 115° F. (46.1° C.).

FIG. 3 displays displacement data for an SMP at 105° F. (40.6° C.). Here, the height of the SMP versus the time is graphed, and the expansion of the SMP increases for greater than 115 hours. The expansion of three separate SMP samples was tested, and the data indicates that the measurements are highly reproducible. Therefore, the expansion of the SMP is well-defined and can be controlled.

FIG. 4 shows data for SMP samples at a temperature of 110° F. (43.3° C.), and FIG. 5 shows data for SMP samples at a temperature of 115° F. (46.1° C.).

Figure 6:
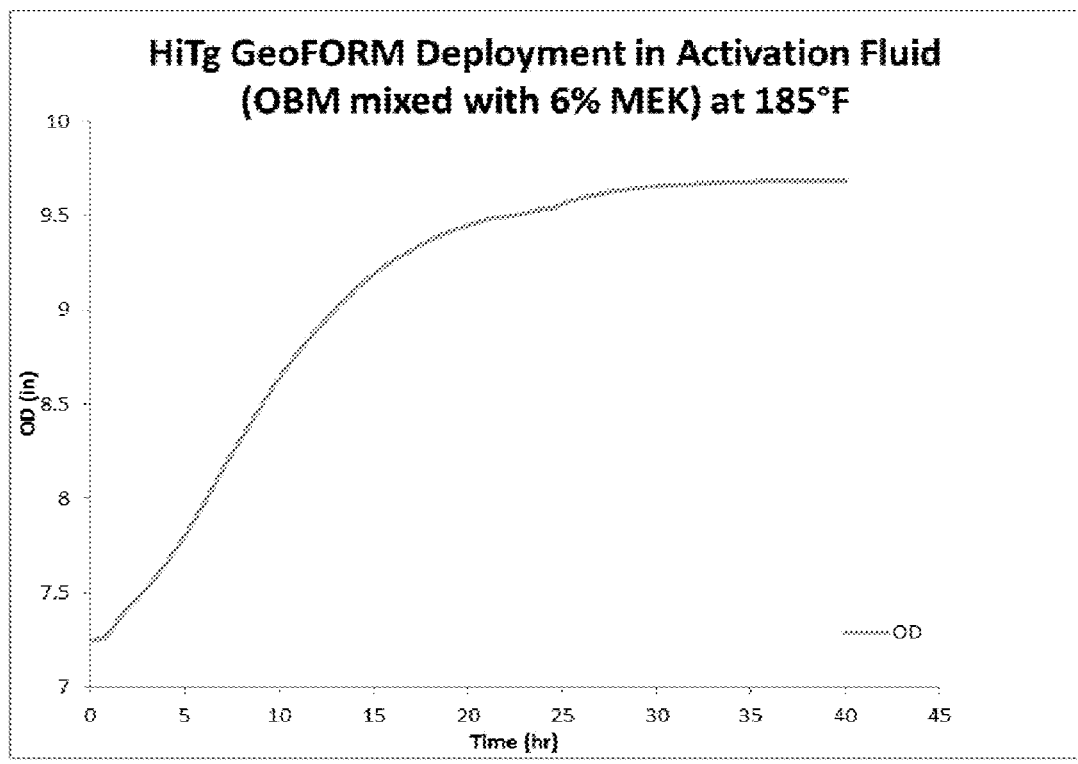
FIG. 6 is a graph of the outer diameter of a high Tg shape memory polymer over time for an activation fluid.

FIG. 6 displays displacement data for an SMP at 185° F. (85° C.). The activation fluid was an oil based mud (OBM; solids-free OMNIFLOW available from Baker Hughes) mixed with 6 vol % methyl ethyl ketone (MEK). The dry Tg of the SMP ranged from 142-148° C. (high Tg or HiTg). Here, the outer diameter (OD) of the SMP versus the time is graphed, and the expansion of the SMP increases for 40 hours.

Figure 7:
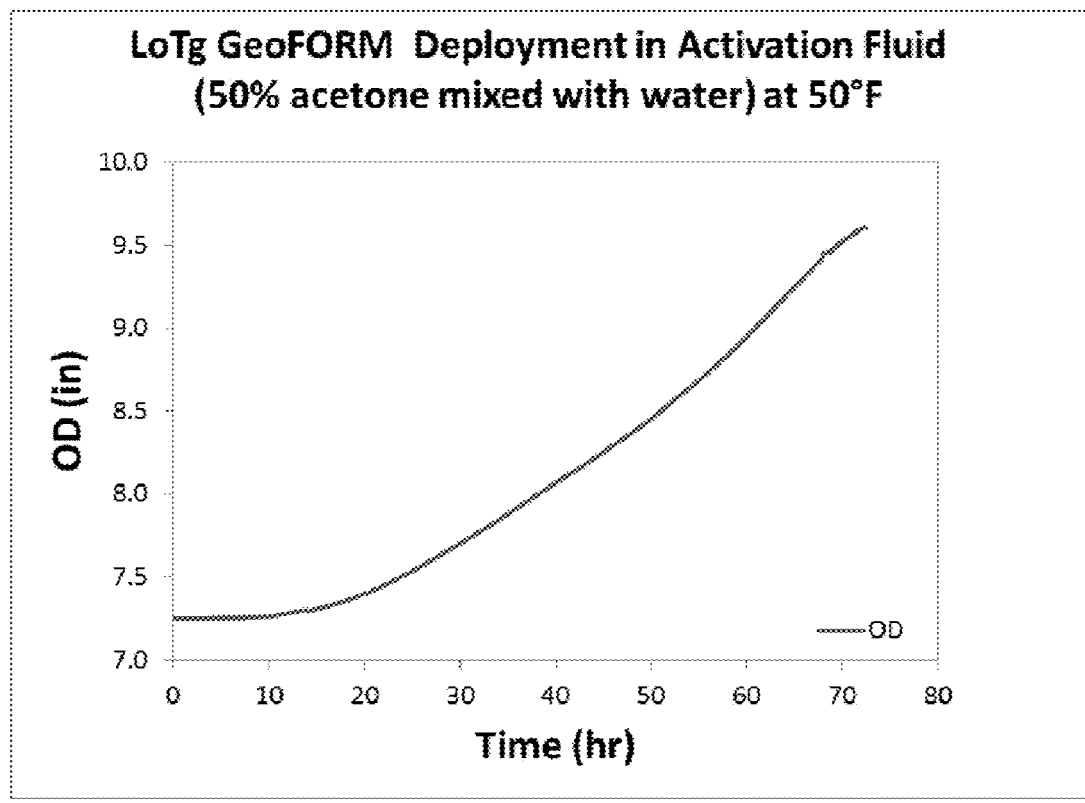
FIG. 7 is a graph of the outer diameter of a low Tg shape memory polymer over time for an activation fluid.

FIG. 7 displays displacement data for an SMP prepared as described above, at 50° F. (10° C.) where the activation fluid was 50 vol % acetone in water) as graph of the outer diameter of a low Tg shape memory polymer over 70 hours. The dry Tg for this SMP was 98-105° C. (low Tg or LoTg).

Figure 8:
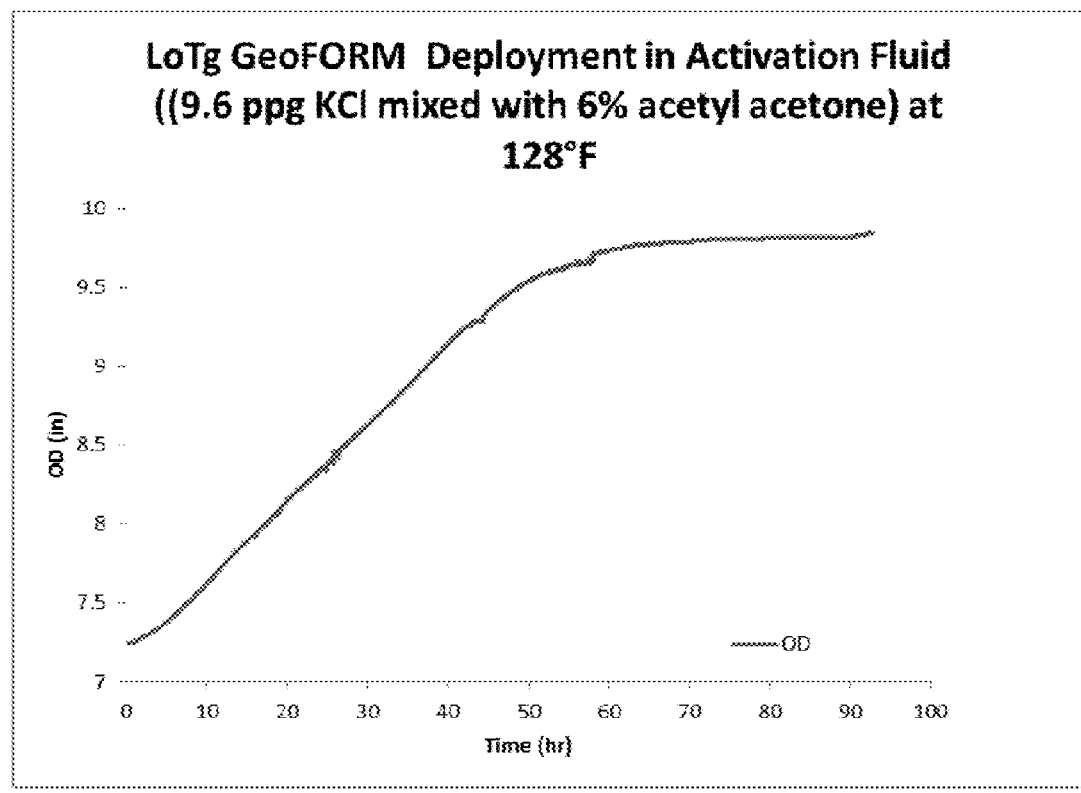
FIG. 8 is a graph of the outer diameter of a low Tg shape memory polymer over time for an activation fluid.

FIG. 8 displays displacement data for an SMP prepared as described above, at 128° F. (53° C.) where the activation fluid was 9.6 ppg KCl (1.2 kg/L) with 6 vol % acetyl acetone as graph of the outer diameter of a low Tg shape memory polymer over 70 hours. Again, the dry Tg for this SMP was 98-105° C. (low Tg or LoTg).

Therefore, FIGS. 3-8 show that the expansion of the SMP is well-defined and can be controlled.

Figure 9:
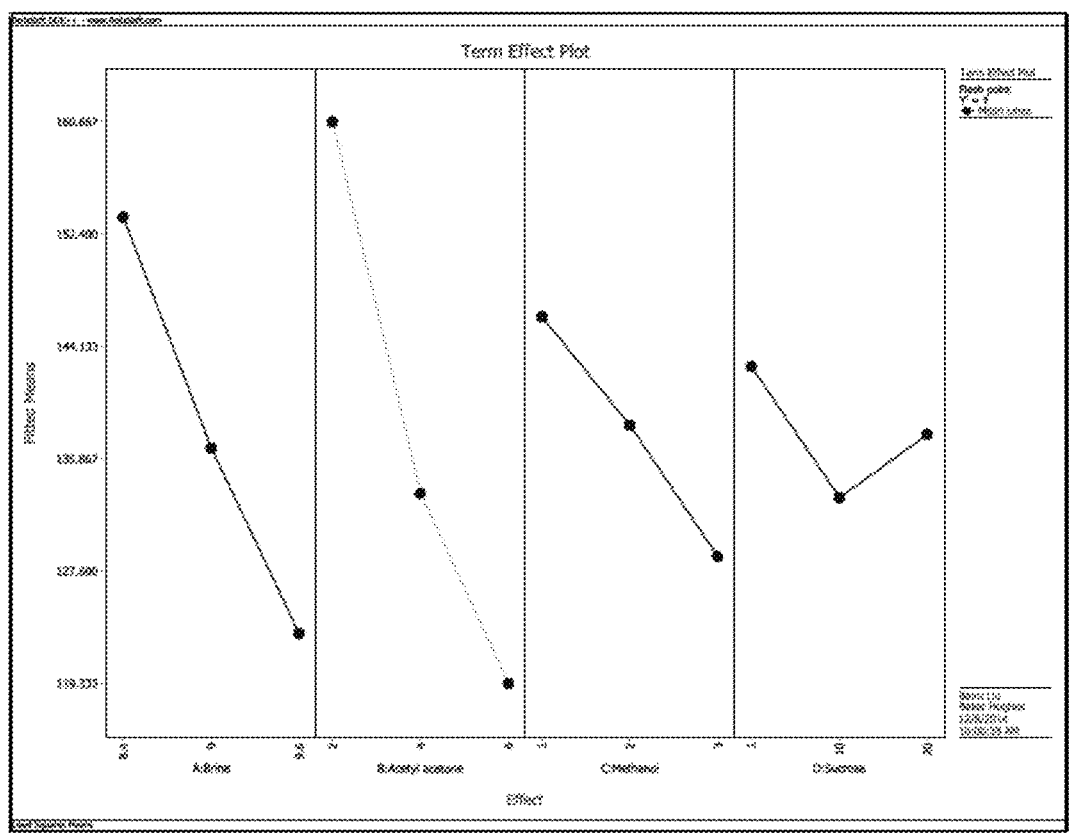
FIG. 9 is a Term Effect Plot showing the effect of concentrations of acetyl acetone, methanol, sucrose, and potassium chloride on flash points.

Nine activation fluids, for Examples 1 through 9, were designed with the Central Composite Response Surface Method of Design of Experiments (DOE++). In these fluids, the concentrations of the acetyl acetone were 2 vol % (Exs. 1, 2 and 7), 4 vol % (Ex. 4, 5 and 6), and 6 vol % (Exs. 3, 8 and 9); the concentrations of methanol were 1 vol % (Exs. 6, 7 and 9), 2 vol % (Exs. 1, 3 and 5), and 3 vol % (Exs. 2, 4 and 8); and the concentrations of sucrose were 1 w % (weight %) (Exs. 3, 4, and 7), 10 w % (Exs. 2, 5 and 9), and 20 w % (Exs. 1, 6 and 8). The fluids were then balanced by 8.4, 9.0, and 9.6 pounds per gallon potassium chloride brine, respectively. The Term Effect Plot in FIG. 9 shows the effect of concentrations of acetyl acetone, methanol, sucrose, and potassium chloride on flash points. The higher concentration of acetyl acetone, methanol, and potassium chloride, the lower the flash point. However, for sucrose, the flash point decreased with concentration increasing from 1 to 10 w %, then unexpectedly increased when its concentration increased from 10 to 20 w %. Thus it has been discovered that an effective amount of sugar in the activation can raise the flash point of the activation fluid.

TABLE I

FLASH POINTS OF ACTIVATION FLUIDS USING SUCROSE

| Activation fluid | Composition | Flash point, ° F. (° C.) (ASTM D93) |
| --- | --- | --- |
| Ex. 1 | 2 vol % acetyl acetone + 2 vol % methanol + 20 w % sucrose + 96 vol % of 9.0 ppg potassium chloride | 160 (71) |
| Ex. 2 | 2 vol % acetyl acetone + 3 vol % methanol + 10 w % sucrose + 95 vol % of 9.6 ppg potassium chloride | 132 (56) |
| Ex. 3 | 6 vol % acetyl acetone + 2 vol % methanol + 1 w % sucrose + 92 vol % of 9.6 ppg potassium chloride | 110 (43) |
| Ex. 4 | 4 vol % acetyl acetone + 3 vol % methanol + 1 w % sucrose % + 93 vol % of 9.0 ppg potassium chloride | 128 (53) |
| Ex. 5 | 4 vol % acetyl acetone + 2 vol % methanol + 10 w % sucrose + 94 vol % of 8.4 ppg potassium chloride | 145 (63) |
| Ex. 6 | 4 vol % acetyl acetone + 1 vol % methanol + 20 w % sucrose + 95 vol % of 9.6 ppg potassium chloride | 127 (53) |
| Ex. 7 | 2 vol % acetyl acetone + 1 vol % methanol + 1 w % sucrose + 97 vol % of 8.4 ppg potassium chloride | 190 (88) |
| Ex. 8 | 6 vol % acetyl acetone + 3 vol % methanol + 20 w % sucrose + 91 vol % of 8.4 ppg potassium chloride | 126 (52) |
| Ex. 9 | 6 vol % acetyl acetone + 1 vol % methanol + 10 w % sucrose + 93 vol % of 9.0 ppg potassium chloride | 122 (50) |

Table II showed the comparison of flash points of activation fluids with and without sucrose or D-Fructose. The data showed the flash points increased by adding sucrose or D-Fructose to the activation fluids. Four activations fluids, for Examples 10 through 13, were prepared with the compositions shown in Table II below. The flash points for each were measured. The compositional difference between the Ex. 11 activation fluid and the Ex. 10 activation fluid was that the Ex. 10 activation fluid contained 10 wt % sucrose. The flash point of the Ex. 10 activation fluid was 2° F. (about 1° C.) higher than the flash point of the Ex. 11 activation fluid. The compositional difference between the Ex. 13 activation fluid and the Ex. 3 activation fluid was that the Ex. 12 activation fluid contained 10 wt % D-fructose. The flash point of the Ex. 12 activation fluid was 11° F. (about 6° C.) higher than the flash point of the Ex. 13 activation fluid.

TABLE II

FLASH POINTS OF ACTIVATION FLUIDS

| Activation fluid | Composition | Flash point, ° F. (° C.) (ASTM D93) |
| --- | --- | --- |
| Ex. 10 | 6 vol % acetyl acetone + 1 vol % methanol + 10 w % sucrose + 9.0 ppg potassium chloride | 122 (50) |
| Ex. 11 | 6 vol % acetyl acetone + 1 vol % methanol + 93 vol % 9.0 ppg potassium chloride | 120 (49) |
| Ex. 12 | 6 vol % acetyl acetone + 3 vol % methanol + 10 w % D-fructose + 91 vol % of 9.6 ppg potassium chloride | 115 (46) |
| Ex. 13 | 6 vol % acetyl acetone + 3 vol % methanol + 91 vol % 9.6 ppg potassium chloride | 104 (40) |

While one or more embodiments have been shown and described, modifications and substitutions may be made thereto without departing from the spirit and scope of the invention. Accordingly, it is to be understood that the present invention has been described by way of illustrations and not limitation.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the sugar(s) includes at least one sugar). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

It is to be further understood that the invention is not limited to the exact details of construction, operation, exact components, or embodiments shown and described, as modifications and equivalents will be apparent to one skilled in the art. Accordingly, the invention is therefore to be limited only by the scope of the appended claims. Further, the specification is to be regarded in an illustrative rather than a restrictive sense. For example, specific combinations of components to make the polyurethane shape-memory material, particular $T_g$s, shape memory polymers, activation fluids, sugars, specific downhole tool configurations, particular compositions, plasticizers, polymer filter cake breakers, designs and other compositions, components and structures falling within the claimed parameters, but not specifically identified or tried in a particular method or apparatus, are anticipated to be within the scope of this invention.

The terms "comprises" and "comprising" in the claims should be interpreted to mean including, but not limited to, the recited elements.

The present invention may suitably comprise, consist or consist essentially of the elements disclosed and may be practiced in the absence of an element not disclosed. For instance, there may be provided a method for deploying a shape memory polymer, consisting essentially of or consisting of disposing a shape memory polymer having a deformed shape in an environment at a first temperature, the shape memory polymer having a first glass transition temperature which is greater than the first temperature; decreasing the glass transition temperature of shape memory polymer from the first glass transition temperature to a second glass transition temperature which is less than or equal to the first temperature comprising contacting the shape memory polymer with an activation fluid selected from the group consisting of methanol, aldehydes, amides, amines, carboxylic acids, esters, diketones, glycol ethers, carbohydrates, and combinations thereof, where the activation fluid additionally comprises, consists essentially of or consists of a sugar present in an amount effective to raise a flash point of the activation fluid where the sugar is selected from the group consisting of fructose, galactose, glucose, lactose, maltose, sucrose, and combinations thereof; and the method further consists essentially of or consists of expanding the shape memory polymer to deploy the shape memory polymer in a deployed shape.

Alternatively there may be provided a method for deploying a shape memory polymer in a downhole environment, consisting essentially of or consisting of disposing a shape memory polymer having a deformed shape in the downhole environment which is at a first temperature; contacting the shape memory polymer with an activation fluid to decrease the glass transition temperature of the shape memory polymer below the first temperature, where the activation fluid is selected from the group consisting of methanol, aldehydes, amides, amines, carboxylic acids, esters, diketones, glycol ethers, carbohydrates, and combinations thereof, where the activation fluid additionally comprises, consists essentially of or consists of a sugar present in an amount effective to raise a flash point of the activation fluid by at least 2° F. (1.1° C.) where the sugar is selected from the group consisting of fructose, galactose, glucose, lactose, maltose, sucrose, and combinations thereof; expanding the shape memory polymer to a deployed shape; and displacing the activation fluid to increase the glass transition temperature to greater than the first temperature and to maintain the shape memory polymer in the deployed shape.

Further, there may be provided in another non-restrictive version a system for deploying a shape memory polymer, consisting essentially of or consisting of an activation fluid selected from the group consisting of methanol, aldehydes, amides, amines, carboxylic acids, esters, diketones, glycol ethers, carbohydrates, and combinations thereof, where the activation fluid additionally comprises, consists essentially of, or consists of a sugar present in an amount effective to raise a flash point of the activation fluid where the sugar is selected from the group consisting of fructose, galactose, glucose, lactose, maltose, sucrose, and combinations thereof; and where the system further consists essentially of or consists of a shape memory polymer which is deployed by a decrease in its glass transition temperature in response to contact with the activation fluid.

What is claimed is:

1. A method for deploying a shape memory polymer in a downhole environment, comprising:
    disposing a shape memory polymer having a deformed shape in the downhole environment at a first temperature, the shape memory polymer having a first glass transition temperature that is greater than the first temperature;
    contacting the shape memory polymer with an activation fluid in an amount effective to decrease the glass transition temperature of the shape memory polymer from the first glass transition temperature to a second glass transition temperature which is less than or equal to the first temperature where the activation fluid comprises acetyl acetone and methanol; where the activation fluid comprises a sugar present in an amount effective to raise a flash point of the activation fluid where the sugar is selected from the group consisting of fructose, sucrose, and combinations thereof, where the amount of sugar in the activation fluid ranges from about 0.5 to about 20 wt %; and
    expanding the shape memory polymer to deploy the shape memory polymer in a deployed shape in the downhole environment.

2. The method of claim 1 where the flash point is raised by at least 2° F. (1.1° C.).

3. The method of claim 1 where the shape memory polymer is selected from the group consisting of a polyurethane, a polyurethane made by reacting a polycarbonate polyol with a polyisocyanate, a polystyrene, a polyethylene, an epoxy, a rubber, a fluoroelastomers, a nitrile, a polymer made from ethylene propylene diene monomers (EPDM), a polyamide, a polyurea, a polyvinyl alcohol, a vinyl alcohol-vinyl ester copolymer, a phenolic polymer, a polybenzimidazole, a polyethylene oxide/acrylic acid/methacrylic acid copolymer crosslinked with N,N'-methylene-bis-acrylamide, a polyethylene oxide/methacrylic acid/N-vinyl-2-pyrrolidone copolymer crosslinked with ethylene glycol dimethacrylate, a polyethylene oxide/poly(methyl methacrylate)/N-vinyl-2-pyrrolidone copolymer crosslinked with ethylene glycol dimethacrylate, combinations thereof.

4. The method of claim 1 where the first glass transition temperature ranges from about 100° C. to about 150° C., and where the second glass transition temperature ranges from about 40° C. to about 100° C.

5. The method of claim 1 where the second glass transition temperature is about 10° C. to about 60° C. less than the first glass transition temperature.

6. The method of claim 1 where the first temperature ranges from about 60° C. to about 100° C.

7. The method of claim 1 further comprising changing a mechanical property of the shape memory polymer, where the property is selected from the group consisting of lowering Young's modulus, increasing toughness, and both.

8. A method for deploying a shape memory polymer in a downhole environment, comprising:
    disposing a shape memory polymer having a deformed shape in the downhole environment at a first temperature;
    contacting the shape memory polymer with an activation fluid to decrease the glass transition temperature of the shape memory polymer below the first temperature, where the activation fluid is comprises acetyl acetone and methanol; where the activation fluid comprises a sugar present in an amount effective to raise a flash point of the activation fluid by at least 2° F. (1.1° C.) where the sugar is selected from the group consisting of fructose, sucrose, and combinations thereof, where the amount of sugar in the activation fluid ranges from about 0.5 to about 20 wt %;

expanding the shape memory polymer to a deployed shape; and displacing the activation fluid to increase the glass transition temperature to greater than the first temperature and to maintain the shape memory polymer in the deployed shape.

9. The method of claim 8 where the shape memory polymer is selected from the group consisting of a polyurethane, a polyurethane made by reacting a polycarbonate polyol with a polyisocyanate, a polystyrene, a polyethylene, an epoxy, a rubber, a fluoroelastomers, a nitrile, a polymer made from ethylene propylene diene monomers (EPDM), a polyamide, a polyurea, a polyvinyl alcohol, a vinyl alcohol-vinyl ester copolymer, a phenolic polymer, a polybenzimidazole, a polyethylene oxide/acrylic acid/methacrylic acid copolymer crosslinked with N,N'-methylene-bis-acrylamide, a polyethylene oxide/methacrylic acid/N-vinyl-2-pyrrolidone copolymer crosslinked with ethylene glycol dimethacrylate, a polyethylene oxide/poly(methyl methacrylate)/N-vinyl-2-pyrrolidone copolymer crosslinked with ethylene glycol dimethacrylate, combinations thereof.

10. A system for deploying a shape memory polymer in a downhole environment, comprising:

an activation fluid comprising acetyl acetone and methanol; where the activation fluid comprises a sugar present in an amount effective to raise a flash point of the activation fluid where the sugar is selected from the group consisting of fructose, sucrose, and combinations thereof, where the amount of sugar in the activation fluid ranges from about 0.5 to about 20 wt %; and a shape memory polymer configured to deploy in the downhole environment at a first temperature by a decrease in its glass transition temperature in response to contact with the activation fluid.

11. The system of claim 10 where the flash point is raised by at least 2° F. (1.1° C.).

12. The system of claim 10 where the shape memory polymer is selected from the group consisting of a polyurethane, a polyurethane made by reacting a polycarbonate polyol with a polyisocyanate, a polystyrene, a polyethylene, an epoxy, a rubber, a fluoroelastomers, a nitrile, a polymer made from ethylene propylene diene monomers (EPDM), a polyamide, a polyurea, a polyvinyl alcohol, a vinyl alcohol-vinyl ester copolymer, a phenolic polymer, a polybenzimidazole, a polyethylene oxide/acrylic acid/methacrylic acid copolymer crosslinked with N,N'-methylene-bis-acrylamide, a polyethylene oxide/methacrylic acid/N-vinyl-2-pyrrolidone copolymer crosslinked with ethylene glycol dimethacrylate, a polyethylene oxide/poly(methyl methacrylate)/N-vinyl-2-pyrrolidone copolymer crosslinked with ethylene glycol dimethacrylate, combinations thereof.

13. The system of claim 10 where the shape memory polymer has a first glass transition temperature, and the activation fluid is effective to decrease the first glass transition temperature to a second glass transition temperature, where the second glass transition temperature is about 10° C. to about 60° C. less than the first glass transition temperature.

* * * * *